United States Patent [19]

Janner et al.

[11] 4,311,674
[45] Jan. 19, 1982

[54] METHOD OF SEPARATING ISOTOPES FROM GASEOUS MIXTURES

[75] Inventors: Karl Janner, Erlangen; Klaus Gregorius, Neunkirchen a. Brand; Hans-Joachim Niemann, Erlangen; Arno Kersting, Erlangen; Eberhard Schuster, Erlangen, all of Fed. Rep. of Germany

[73] Assignee: Kraftwerk Union Aktiengesellschaft, Mulheim, Fed. Rep. of Germany

[21] Appl. No.: 55,917

[22] Filed: Jul. 9, 1979

Related U.S. Application Data

[63] Continuation of Ser. No. 862,504, Dec. 20, 1977, abandoned.

[30] Foreign Application Priority Data

Dec. 30, 1976 [DE] Fed. Rep. of Germany ....... 2659590

[51] Int. Cl.³ .................... B01D 59/00; B01D 59/02
[52] U.S. Cl. ............................. 423/3; 204/157.1 R
[58] Field of Search .................. 423/3; 204/157.1 R

[56] References Cited

U.S. PATENT DOCUMENTS

| | | | |
|---|---|---|---|
| 3,465,500 | 9/1969 | Fenn | 55/17 |
| 3,559,373 | 2/1971 | Garrett | 55/15 X |
| 3,626,665 | 12/1971 | Fenn et al. | 55/17 |
| 3,788,038 | 1/1974 | Zahner | 55/17 X |
| 4,025,790 | 5/1977 | Jetter et al. | 250/423 P X |
| 4,031,397 | 6/1977 | Cardillo | 250/423 P |
| 4,032,306 | 6/1977 | Lee | 55/17 |
| 4,179,272 | 12/1979 | Kivel | 204/157.1 R X |

FOREIGN PATENT DOCUMENTS

| | | | |
|---|---|---|---|
| 690681 | 7/1964 | Canada | 204/157.1 R |
| 1959767 | 6/1971 | Fed.Rep.of Germany | 204/11DIG. |
| 1258461 | 3/1961 | France | 55/17 |
| 794834 | 5/1958 | United Kingdom | 55/17 |

OTHER PUBLICATIONS

Gochelashvili, K. S. et al., "Methods for Selective Heterogeneous Separation of Vibrationally Excited Molecules", *Sov. Phys.-JETP*, 43(2): 274–277, Feb. 1976.

Gochelashvili, K. S. et al., "Selective Heterogeneous Separation of Vibrationally Excited Molecules", *JETP Lett.*, 21(11): 302–303, Jun. 1975.

Anderson, J. B. et al., "Isotope Separation in a Seeded Beam", *Science*, 187: 642–644, 1975.

Robinson, C. P. et al., "Some Developments in Laser Isotope Separation Research at Los Alamos", DOE Report #LA-UR-76-191, 2/1976.

Butler, J. F., "Pb-Salt Tunable Diode Lasers", Proc. 1st Euro. Electro-Optics Markets and Tech. Conf., pp. 99–105, 1973.

Jetter, H. et al., "Uranium Isotope Separation Using I.R. Lasers", Proc. Int. Conf. on Uranium Isotope Separation, pp. 1–6, Mar. 5–7, 1975, London.

*Primary Examiner*—Deborah L. Kyle
*Attorney, Agent, or Firm*—Herbert L. Lerner

[57] ABSTRACT

Separation of isotopes from a gaseous mixture of substances containing the isotopes by incorporating supplemental gas and adiabatically expanding at an expansion ratio and starting temperature to cool the mixture and effect condensation of at least a portion of the supplemental gas. Laser radiation is applied to effect selective excitation of one isotope component with selective retention of the non-excited isotope component in the condensate. The condensation may be accelerated by generating condensation nuclei. A compression joint may be used to effect a temperature rise of the gaseous mixture and peelers employed to separate the gas stream portion rich in excited isotope component from the portion rich in non-excited isotope component.

17 Claims, 6 Drawing Figures

METHOD OF SEPARATING ISOTOPES FROM GASEOUS MIXTURES

This is a continuation, of application Ser. No. 862,504, filed Dec. 20, 1977 and now abandoned.

BACKGROUND OF THE INVENTION

1. Field of the Invention

The present invention relates to a method of separating isotopes from gaseous mixtures of substances by means of excitation specific to the isotopes by electromagnetic radiation.

2. Description of the Prior Art

Laser radiation permits one to generate frequencies from the infrared to the ultraviolet region and to achieve high intensity in a very narrow frequency band. Such radiation is therefore suited for selectively exciting in a mixture of substances, those substances, the absorption spectrum of which exhibits absorption lines of that wavelength. Years ago, these properties of laser radiation led to using lasers for the purpose of isotope separation. In this connection, reference is made to the German Published Non-Prosecuted Application No. 1 959 767, in which excitation, specific to the isotope of the one isotope compound, is proposed, to thereby enable the excited isotope compound to react chemically with a reaction partner. Fractional distillation has been proposed for separating the reaction product, which preferably contains only the one isotope compound. The objective of this German Published Application as well as of many other publications was the separation of the isotopes of uranium in view of the increasing demand for enriched nuclear fuel and the extremely high technical as well as financial costs of enrichment plants, especially those operating according to the diffusion principle. All proposals were based on $UF_6$ as this was practically the only gaseous uranium compound. It turned out, however, that the absorption lines in this compound are so close together at room temperature that the bands practically form a continuum. In addition, the bands of the isotope compounds 235 $UF_6$ and 238 $UF_6$ overlap so much that selective excitation of the one isotope compound is possible only to a very limited extent. In the German Published Non-Prosecuted Application No. 2 447 762, the proposal was therefore made to adiabatically decompress the gaseous $UF_6$ and to subsequently excite the one isotope compound and thereby enable it to enter into a chemical reaction with a reaction partner. The cooling down in the adiabatic expansion causes, so to speak, a freezing of the vibration states of the molecules and a reduction of the rotations, so that thereby a very substantial narrowing of the bands occurs, particularly of their Q-branch. This brings about a sufficient distance from the Q-branch of the other isotope compound and selective excitation becomes possible. Here, too, the chemical reaction product which contains the excited uranium isotope, must be separated and recovered by physical or chemical means.

SUMMARY OF THE INVENTION

An object of the present invention is to provide a simpler, more efficient method of separating the uranium isotope compounds on the basis of cooling by adiabatic expansion of the same and without chemical reaction with a reaction partner.

With the foregoing and other objects in view, there is provided in accordance with the invention, a method of separating isotopes from a gaseous mixture of substances containing the isotopes by selective excitation of one isotope component in the gaseous mixture, including incorporating supplemental gas in admixture with the isotope components in the gaseous mixture of substances, adiabatically expanding the gaseous mixture containing the supplemental gas at an expansion ratio and starting temperature to cool the mixture and effect condensation of at least a portion of the supplemental gas and permit selective excitation by laser radiation of one isotope component and selective retention of the non-excited isotope component in the condensate.

In a preferred embodiment in accordance with the invention; condensation is accelerated by generating condensation nuclei in the gaseous mixture. In another embodiment, the gaseous mixture of substances containing supplemental gas is after adiabatic expansion and selective excitation of one isotope component by laser radiation, passed through at least one compression point to effect a temperature rise.

Other features which are considered as characteristic for the invention are set forth in the appended claims.

Although the invention is illustrated and described herein as embodied in method of separating isotopes from gaseous mixtures, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
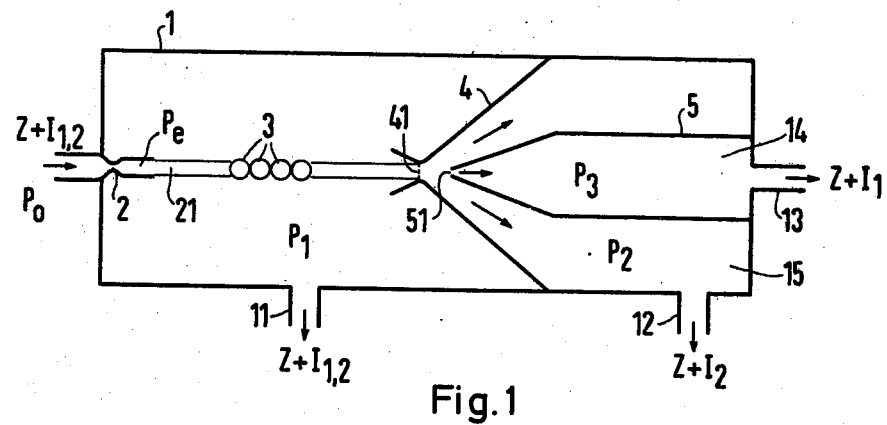
FIG. 1 diagrammatically illustrates a separation chamber in which a gas mixture of isotope compounds and a supplemental gas enter through an expansion nozzle and after adiabatic expansion and laser radiation are separated into a gas stream fraction having a higher concentration of excited isotope component and a gas stream fraction having a higher concentration of non-excited isotope component.

The gaseous mixture of substances together with supplemental gas in excess, is expanded adiabatically. The expansion ratio as well as the starting temperature are chosen so that, excitation specific to the isotope is achieved and adsorption of the non-excited molecules of the isotope mixture in at least one component of the supplemental gas occurs. Condensation is conversion of at least one component of the supplemental gas to a more compact form. The complexes produced by adsorption of the non-excited molecules in the component of the supplemental gas or incorporation of the non-excited molecules in the condensate of the component of the supplemental gas are subsequently separated by physical means from that part of the mixture of substances which remain in the gaseous state. It has been found to be advantageous for the supplemental gas to have an adiabatic coefficient $\geq 1.2$ as well as great adsorption affinity or embedding capacity for the non-excited isotope compound. In this procedure, the non-excited portions of the mixture of substances are therefore adsorbed or embedded in the condensed supplemental gas. The excited isotope compound is not, or less frequently, incorporated in the condensed supplemental gas due to the higher vibration states reached by the excited isotope compound.

Apart from the requirements for selective excitation the temperature and the pressure must be lowered by the adiabatic expansion to such an extent that either at least one component of the supplemental gas is supersaturated or adsorption at at least one component of the supplemental gas takes place. The former is a condition for the setting-in of the condensation. As is well known, rapid condensation can be achieved by introducing condensation nuclei generated by electromagnetic or radioactive radiation. Admixing an easily condensable gas such as iodine vapor also works in this direction.

The incidence point of the radiation, at which the excitation of the molecules to be separated takes place, should be located close to, and in, the condensation zone, so that the non-excited molecules of the molecules to be separated are largely embedded in the condensate before the excited molecules have lost their energy by collisions and there is no longer a difference in the absorption probability. This means that it is advantageous to keep the life of the excited states long as compared to the condensation time or to make the condensation time short, so that considerable separation can be achieved in one stage.

The longest possible life of the excited states is achieved here through the choice of suitable supplemental gases. These are gases which either have no vibration states or the excitation frequency of which is very much different from the incident frequency, as thereby, energy losses in collisions remain small. The condensation time is kept short by, on the one hand, saturating heavily and possibly seeding and by, on the other hand, stopping further condensation at the point of optimum separation by increasing the temperature. This can be accomplished, for instance, by one or several compression joints which are designed so that the condensation comes to a standstill due to the temperature rise that occurs. In addition, the pressure recovery of the gas stream which is carried out during and after this period of condensation and excitation, can be driven so far that the flow is transferred into the subsonic region and is further increased in the connected diffusor.

Stopping the condensation at the point of optimal separation by raising the temperature is not necessary in all cases. It is not necessary, for instance, if further condensation nearly comes to a standstill without such measures as raising the temperature, as in the case when the gas portion of the condensing component of the supplemental gas was chosen so that it is sufficiently depleted or the condensate portion has approached the portion belonging to the stationary state at the respective expansion. If, after incorporation of the non-excited isotope compound at or via the nuclei in the supplemental gas, it would be unnecessary to adsorb or incorporate the excited isotope compounds in an outer layer and then separate this outer layer from the nucleus by evaporating off.

This means that the isotope separation proper takes place, at least initially, by adsorption or incorporation of the non-excited isotope compounds at or in the condensed part of the supplemental gas. Subsequently, the spatial separation of the excited and therefore, not adsorbed isotope compounds takes place. Also, the excited isotope compounds may at first, be externally adsorbed and again evaporated, after which separation of the gaseous isotope compounds from the condensation or adsorption complexes then takes place. There are several methods for doing this, as for example, with the mentioned compression joints for pressure recovery, wherein the segregation phenomena, which can be produced in different ways due to the inertial forces, are utilized in the jet or stream of the mixture of substances. More specifically, that portion of the flow of the mixture of substances with a depleted excited isotope component are separated by a peeler from the mixture of substances with an enriched isotope component. Subsequently the stream containing the depleted excited isotope and the stream containing the enriched excited isotope are conducted into different chambers or may be condensed at different places.

Separation of the isotopes may be accomplished by suctioning off the gaseous parts of the mixture of substances upon the entry of the jet or stream of the mixture of substances into a space of lower pressure, and freezing out the isotope compound. Since a mixture of gas and condensed heavy particles is involved, separation can be accomplished by use of the known procedure of cyclone dust removal.

To explain the invention in further detail, reference is made to arrangements for separating isotopes, schematically shown in FIGS. 1 to 6. Parts with corresponding functions are labelled with the same reference symbols.

FIG. 1 schematically shows the separation vessel 1 proper in a verical section. The gas mixture consisting of the isotope mixture $I_{1,2}$ and the supplemental gas Z enters on the left side of vessel 1 through the expansion nozzle 2. Both the isotope mixture $I_{1,2}$ and the supplemental gas Z can be mixed prior to entering the nozzle 2 in a mixing chamber, not shown, at a pressure $p_o$ in the mixing chamber. To obtain a parallel jet or stream of the gas mixture, the nozzle exit pressure $p_e$ of the jet or stream 21 of mixture of substances should desirably not be much different from the pressure $p_1$ in the interior of the chamber 1. The nozzle 2 is constructed as a slit nozzle and is, for instance 0.5 m wide. Accordingly, the jet 21 of the mixture of substances has the shape of a ribbon and is traversed from its narrow side by the excited laser radiation 3. For the sake of clarity, the laser equipment is not shown; the laser beam can consist of several nearly parallel beams, as shown, which adjoin each other closely or with gaps, depending on optimization of life and enrichment of the excited isotope component. In the case of medium or weak absorption, laser radiation can be generated by multiple reflection of a beam. It is also possible to use a laser beam with a correspondingly oblong cross section. The ray path through the jet 21 of mixture of substances can also be designed as an optical resonator section in known manner, if the absorption is medium or weak, whereby better excitation efficiency can be achieved with a given amount of laser power. The condensation of the supplemental gas Z as well as the adsorption and embedment of the non-excited isotope compound $I_1$ takes place during this irradiation or directly thereafter.

The jet 21 subsequently enters a receiving channel 4 which is again of slit-shaped design and at the narrowest point of which a compression joint 41 is produced by adjusting the pressure $p_2$. This joint 41 produces a reduction of the velocity and an increase in the temperature and thereby, first, the termination of the condensation, so that also those particles which have in the meantime lost their excited state due to collisions, are no longer adsorbed at condensation nuclei. These excited particles belong to the isotope compound $I_2$. Beyond this, a broadening of the jet is obtained by the widening of the flow channel after the compression joint 41 in which widening process the lighter portions of the jet or stream of substances, among them the gaseous isotope compound $I_2$, are predominantly deflected outward. The heavier component from the condensation complexes, on the other hand, flows out substantially straight, following the inertia, and enters the plenum 14, which, opposite the compression joint 41, is provided with a slit-shaped aperture 51. Thus, the excited part $I_2$ of the original isotope mixture collects, thanks to these arrangements, in the space 15 and can be drawn off via the line 12, with of course a portion of the supplemental gas Z. The condensed part of the supplemental gas with the adsorbed isotope compounds $I_1$ is collected in the space 14 and can be removed through the line 13. By adjusting the pressure $p_3$ relative to the pressure $p_2$, the gas portion flowing into and out of the space 14 can be varied and be set to a magnitude optimum for the separation.

Instead of a parallel stream, the pressure $p_1$ can be reduced in known manner so that the stream expands at first toward the nozzle 2 and then becomes narrower again toward the funnel-shaped slit of the wall 4. Thereby, part of the expansion can be localized behind the nozzle.

The isotope mixture to be separated consists, for example, of 235 $UF_6$ and 238 $UF_6$ with xenon as the supplemental gas. The molar mixing ratio is about 1:50. The entry temperature into the nozzle is 320 K. and the temperature after expansion about 30 K. At its narrowest point the nozzle has a slit of 0.1 mm. Thus, for an entry pressure of 5 bar, a pressure $p_e$ in the jet of substance mixture 21, of about 7 millibar is obtained. The irradiation takes place, in the Q-branch of the $\nu_3$ fundamental of the 235 $UF_6$ with a bandwidth which covers the most substantial part of the Q-band. However, combination oscillations such as $\nu_1 + \nu_3$ also can be employed.

If $CO_2$ is used as the supplemental gas, a temperature of 50 K. and a pressure of 1.3 millibar are obtained after the expansion, for the same mixing ratio. At its narrowest point, the nozzle 2 then is 0.02 mm wide and at its exit side in the interior of the vessel 1, has a width of 3 mm. In this case, the irradiation can take place in the Q-branch of the $\nu_1 + \nu_3$ of the 235 $UF_6$ with a bandwidth which covers the most substantial part of the Q-branch.

Figure 2:
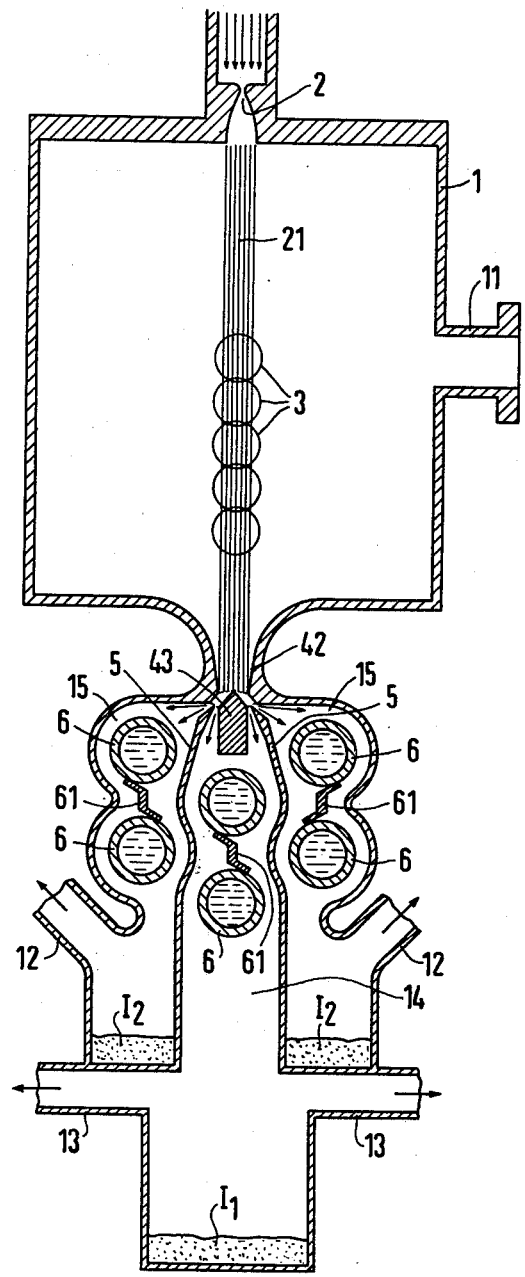
FIG. 2 illustrates another form of separation chamber with particular reference to a wedge type compression joint.
Figure 3:
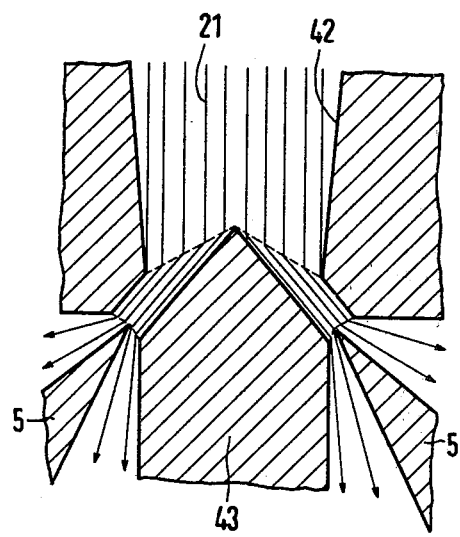
FIG. 3 is an enlarged view of the wedge type compression joint shown in FIG. 2.

As shown in FIG. 2, the compression joint 41 can also be obtained by means of a wedge 43. The outward deflection of the flow causes the agglomerated complexes of larger mass to collect, due to their inertia, in that flow zone which is adjacent to the wedge 43. The substance of the agglomerated complexes of larger mass remains predominantly in these zones even if the complexes evaporate due to the heating of the gas by the compression joint or when they hit the wedge. Subsequently, each of the two lateral substreams is split by the bezelled peeler 5 into two further substreams, of which the substream facing the wedge 43 contains the non-excited kind of isotope, i.e., in the present example, the depleted uranium, and the outer substream contains the excited kind of isotope, i.e., the enriched uranium.

The compression joints shown (see in particular, FIG. 3 which depicts an enlargement of FIG. 2) transform the original supersonic flow into a subsonic flow while pressure and temperature increase. The adjoining flare-out serves as a diffusor and leads to a further pressure increase. This reduces the cost of the pumps substantially.

In FIG. 2 cooled cylinders 6, on which the isotope compounds are deposited in solid form, are shown in the spaces 15 and 15. These cylinders may be rotatable with stripping devices 61 to scrape off the particles deposited thereon and thus collect them as solids in the manner indicated. The remaining residual gases are drawn off via the lines 12 and 13. These withdrawn residual gases contain little or none of the isotope compounds.

Figure 4:
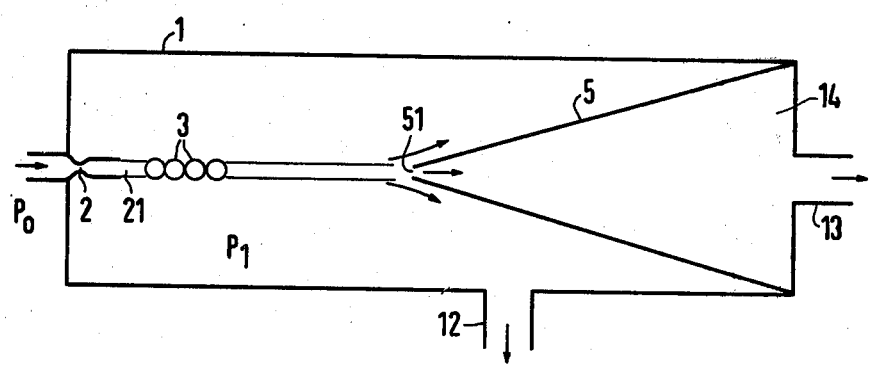
FIG. 4 illustrates a modified method of separating that portion of the gas stream enriched with excited isotope component.

Another modified method of separating the enriched portion of the isotope compound from the adsorbed, i.e., not enriched or depleted portion is shown in FIG. 4.

The expansion nozzle 2 and the partition 5 have the same function as in FIG. 1. The cooling by expansion can be driven so far that at first, complete incorporation of the $UF_6$ takes place; however, the non-excited component, e.g., the depleted $UF_6$, is then in the nuclear region of the condensed crystallites. Because of its low adsorption probability, the excited component is in the outer region. In the further course of the jet or stream of substances, the outer layer of the crystallites can be evaporated off due to friction and heat transfer in the residual gas or by irradiation. The slit-shaped inlet of the aperture-like wall 5 is arranged in that part of the chamber, at which the evaporated-off matter has already been distributed but the nuclei are still preserved.

The condensation particles with the adsorbed isotope compounds which are stil preserved pass through inlet slit 51 and enter the chamber 14, while the outer parts of the jet or stream 21, which contain the enriched isotope compound, are peeled off by the inlet slit walls 5 and can be drawn off through the line 12.

Figure 5:
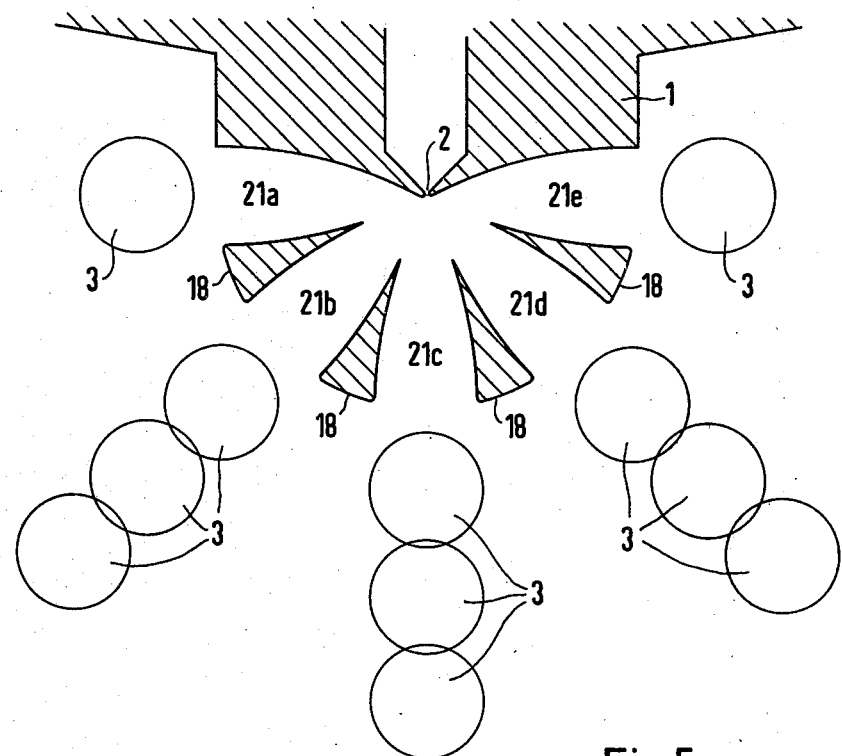
FIG. 5 illustrates a method of fanning out the stream of gas from the expansion nozzle by means of vanes into a plurality of substreams, each of which is separately irradiated and excited.

FIG. 5 shows another procedure for the mechanical working of the stream of substances from the expansion nozzle 2. By fanning out the stream from this differently designed nozzle by means of the vane-shaped elements 18, substreams 21a, b, c, d and e are obtained, each of which is followed by an irradiation and excitation zone 3. One expansion nozzle 2 is thus followed in this case by five like excitation and separation systems such as are described in the preceding figures. The vane-shaped elements 18 have sharp edges opposite the outlet opening 2 and their side surfaces are shaped so that the stream of the mixture of substances approaches them nearly tangentially, and impart to the former the already mentioned form.

Figure 6:
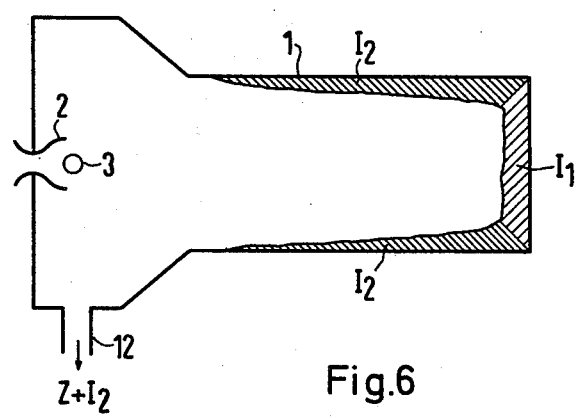
FIG. 6 is a simplified means of effecting separation of the isotopes, in which the laser beam traverses the stream of gas while it is still in the region of the expansion nozzle.

Another rather simple embodiment of the apparatus for carrying out the method according to the invention is shown in FIG. 6, where the laser beam traverses the jet of the gas mixture while it is still in the region of the expansion nozzle 2. The subsequent condensation of the supplemental gas and the adsorption of the non-excited isotope compound causes the development of particles which are heavy as compared to the excited vapor of the isotope compound. The latter will therefore fan out much more than the heavier condensed particles if the pressure in the jet or stream of substances upon leaving the nozzle is substantially higher than the internal pressure in the vessel 1, so that the heavier particles settle predominantly on the part of the vessel wall opposite the nozzle, but the excited particles settle predominantly on the upper and lower surfaces which confine the chamber 1. The required internal pressure in the vessel 1 is established via the line 12 by suctioning off the supplemental gas and part of the excited isotope compound $I_2$. The wall of the vessel is cooled, of course, for depositing the isotope compound $I_2$ and $I_1$, respectively, and in addition, devices, not shown, are provided for taking off the isotope compounds selectively separated on the walls. According to this example, however, sharply separated deposition of the excited and the not excited isotope compound particles should not be expected; there is obtained instead a steady transition between the deposition of non-excited particles, i.e., of the compound $I_1$ in the center of the wall opposite the nozzle 2, and the upper and lower vessel walls, on which the excited particles, i.e., the isotope compound $I_2$, predominantly settle.

The supplemental gas and the conditions of condensation may be chosen such that prior to the condensation, a van der Waals bond occurs between the supplemental gas and the non-excited components of the gas mixture to be separated. This compound is then condensed, while the selectively excited component of the isotope compound does not form these bonds or only to a lesser degree and is therefore incorporated less easily. Conversely, the process can be conducted in such a manner so that this van der Waals bond is first brought about between the two isotope compounds to be separated and the supplemental gas, but one isotope compound is then separated selectively by selective excitation of the one isotope compound, so that then, adsorption of this excited isotope compound at the condensed supplemental gas no longer occurs. Should the amount of heat liberated in the condensation become so large, that it again leads to partial mixing of the separated isotope compounds, it is possible to capture this heat, at least in part, by adding a further gas with a large adiabatic coefficient such as Ar, He, $H_2$.

With regard to the selective excitation, other frequencies, at which there is a difference in the absorption of the isotopes to be separated, can be used. Examples in the case of $UF_6$ are the following rotational vibration bands of $UF_6$: $\nu_3$, $(\nu_2+\nu_4)$; $(\nu_3+\nu_5)$; $(\nu_2+\nu_3)$; $(\nu_3+\nu_4+\nu_6)$; $(\nu_3+2\nu_5)$; $(2\nu_2+\nu_3)$; $3\nu_3$. Although, the individual rotational lines of P- and R-branches can be used, Q-branches are preferable, as with them, a substantially larger share of molecules can be covered selectively. In addition, the strength of the absorption, the energy of the excited state and its life are factors in the choice of the frequency.

There is claimed:

1. In a method of separating isotopes from a gaseous mixture of substances containing the isotopes by selective excitation of one isotope component in the gaseous mixture; the improvement comprising incorporating supplemental gas in admixture with the isotope components in said gaseous mixture of substances, adiabatically expanding the gaseous mixture containing the supplemental gas at an expansion ratio and starting temperature to cool the mixture and effect condensation of at least a portion of the supplemental gas with selective adsorption in the supplemental gas condensate of an isotope component which is non-excited by selective laser radiation and selective excitation by laser radiation of said one isotope component not adsorbed in said supplemental gas condensate and selective retention of the non-excited isotope component in the condensate, effecting said condensation during or after irradiation, and thereafter effecting physical separation due to differences in mass of said condensate with selective retention of the non-excited isotope component from the non-condensed gaseous mixture.

2. Method according to claim 1, wherein the supplemental gas has a higher condensation temperature than the isotope mixture to be separated and has an adiabatic coefficient $\leq 1.2$.

3. Method according to claim 1, wherein xenon is used as the supplemental gas.

4. Method according to claim 1, wherein $CO_2$ is used as the supplemental gas.

5. Method according to claim 1, wherein a further gas with a high adiabatic coefficient is admixed with said gaseous mixture to absorb at least partially, the heat liberated in said condensation.

6. Method according to claim 1, including generating condensation nuclei in the gaseous mixture containing supplemental gas for accelerating the condensation.

7. Method according to claim 6, wherein the condensation nuclei are generated by introducing electromagnetic or radioactive radiation.

8. Method according to claim 6, wherein the condensation nuclei are generated by admixing an easily condensible gas.

9. Method according to claim 8, wherein the easily condensible gas is iodine vapor.

10. Method according to claim 1, wherein $UF_6$ is the isotope mixture.

11. Method according to claim 10, wherein xenon is the supplemental gas and the irradiation takes place by means of a laser in the Q-branch of the $\nu_3$ oscillation of the $UF_6$.

12. Method according to claim 10, wherein xenon is the supplemental gas and the irradiation takes place by means of a laser in one of the combination vibrations of the $UF_6$.

13. Method according to claim 10, wherein $CO_2$ is the supplemental gas and the irradiation takes place by means of a laser in one of the combination vibrations of the $UF_6$.

14. Method according to claim 13, wherein the combination vibration is $(\nu_1+\nu_3)$.

15. Method according to claim 1, wherein said gaseous mixture of substances containing supplemental gas is after adiabatic expansion and selective excitation of one isotope component by laser radiation passed as a stream to separate due to differences in mass the non-condensed portion of the stream rich in excited isotope component from the condensed portion of the stream rich in non-excited isotope component by deflecting the non-condensed portion of the stream and directing the separated streams to separate zones of a collecting device.

16. Method according to claim 1, wherein the gaseous mixture of substances containing supplemental gas is after adiabatic expansion subdivided by vanes into substreams and each substream subjected to laser radiation to effect selective excitation of one isotope component.

17. In a method of separating isotopes from a gaseous mixture of substances containing the isotopes by selective excitation of one isotope component in the gaseous mixture; the improvement comprising incorporating supplemental gas in admixture with the isotope components in said gaseous mixture of substances, adiabatically expanding the gaseous mixture containing the supplemental gas at an expansion ratio and starting temperature to cool the mixture and effect condensation of at least a portion of the supplemental gas with selective adsorption in the supplemental gas condensate of an isotope component which is non-excited by selective laser radiation and selective excitation by laser radiation of said one isotope component not adsorbed in said supplemental gas condensate and selective retention of the non-excited isotope component in the condensate, generating condensation nuclei in the gaseous mixture containing supplemental gas for accelerating the condensation, effecting said condensation during or after irradiation, and thereafter effecting physical separation due to differences in mass of said condensate with selective retention of the non-excited isotope component from the non-condensed gaseous mixture, and wherein said gaseous mixture of substances containing supplemental gas is after adiabatic expansion and selective excitation of one isotope component by laser radiation, passed through at least one compression joint to effect a temperature rise and a pressure increase.

* * * * *